United States Patent
Borean et al.

(10) Patent No.: US 7,359,791 B2
(45) Date of Patent: Apr. 15, 2008

(54) INTERNAL-COMBUSTION ENGINE WITH MEANS FOR DETERMINING THE MASS OF FRESH INTAKE AIR, AND ASSOCIATED METHOD OF DETERMINATION

(75) Inventors: Fabio Borean, Orbassano (IT); Alberto Pisoni, Orbassano (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/699,326

(22) Filed: Jan. 30, 2007

(65) Prior Publication Data

US 2007/0208489 A1 Sep. 6, 2007

(30) Foreign Application Priority Data

Mar. 2, 2006 (EP) .................................. 06425142

(51) Int. Cl.
*G06F 17/00* (2006.01)
*F01L 1/34* (2006.01)
*F02B 75/05* (2006.01)
*F02D 41/00* (2006.01)

(52) U.S. Cl. .................... 701/103; 123/90.15; 123/676

(58) Field of Classification Search ............... 701/101, 701/102, 103, 115; 123/316, 676, 90.15
See application file for complete search history.

(56) References Cited

U.S. PATENT DOCUMENTS

| 5,635,634 A | 6/1997 | Reuschenbach et al. ... 73/118.2 |
| 6,321,156 B1 | 11/2001 | Kraemer .................... 701/102 |
| 6,352,065 B1 | 3/2002 | Wild et al. .................. 123/494 |
| 2003/0182995 A1 | 10/2003 | Rouphael .................... 73/118.1 |
| 2004/0093148 A1 | 5/2004 | Buckland et al. ........... 701/102 |

FOREIGN PATENT DOCUMENTS

| DE | 199 28 560 A1 | 12/2000 |
| DE | 103 46 676 A1 | 5/2004 |
| DE | 103 44 709 A1 | 6/2005 |
| WO | WO 01/42641 A1 | 6/2001 |

OTHER PUBLICATIONS

Eriksson et al, "An Analytic Model for cylinder Pressure in a Four Stroke SI Engine", SAE 2002 World Congress, vol. SAE, No. 2002-01-0371, Apr. 3, 2002, XP 002390220, Detroit Michigan, 8 pages.

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

An internal-combustion engine, comprises at least one cylinder, at least one intake pipe and at least one exhaust pipe associated to the cylinder, at least one intake valve and at least one exhaust valve, which control passage through the intake and exhaust pipes, wherein there are provided first sensor device(s) for detecting the temperature in the intake pipe, second sensor device(s) for detecting the pressure in the intake pipe, third sensor device(s) for detecting the engine r.p.m., and fourth device(s) for detecting or calculating the temperature in the exhaust pipe. An electronic control unit pre-arranged for receiving the signals at output from the first second and third sensor device(s) calculates the amount of fresh air taken in by the engine on the basis of a mathematical model that is of general applicability and that, in particular, is applicable irrespective of the technological implementation specifically used for a system for variable valve actuation with which the engine can be provided.

18 Claims, 4 Drawing Sheets

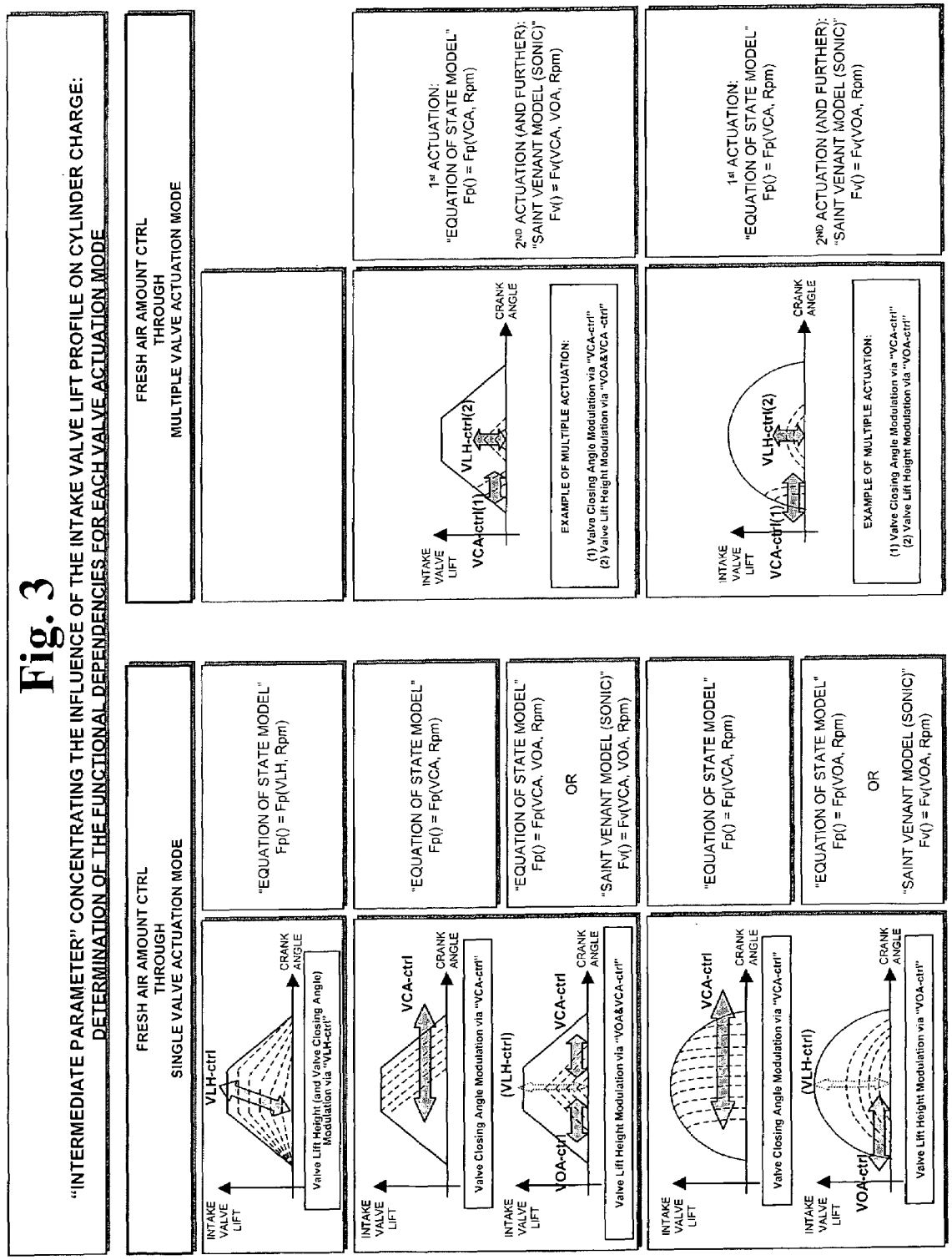

INTERNAL-COMBUSTION ENGINE WITH MEANS FOR DETERMINING THE MASS OF FRESH INTAKE AIR, AND ASSOCIATED METHOD OF DETERMINATION

FIELD OF THE INVENTION

The present invention relates to internal-combustion engines of the type provided with means for determining the mass of fresh air taken in by the engine. The invention relates in particular to an engine of the type indicated in the pre-characterizing part of claim 1.

BASIC TECHNICAL PROBLEM

The present invention stems from the need to propose a method of general application for determining the amount of fresh air taken in by an engine, suited, for example, both for petrol engines and for diesel engines, as well as for engines with a conventional system of valve actuation and for engines provided with systems for variable valve actuation, which are designed for varying the lift and/or the instant of opening and/or the instant of closing of the valves. The detection method must moreover not lose validity even in the case of an engine provided with one or more auxiliary actuators, such as for example a turbosupercharger, or a exhaust-gas recycling (EGR) valve, which affect the thermodynamic conditions of the gases upstream of each intake valve and downstream of each exhaust valve, and which consequently affect the charge taken in by the engine.

Integration of the physical models within the automatic controllers ("model-based control"), in combination with an adequate feedback chain ("robust feedback control"), is an increasingly widespread practice in modern control architectures for industrial applications, given the optimal compromise that is guaranteed between the following needs:

- speeding-up of the transient response of the system (obtained thanks to the model-based prediction chain, usually constructed by dynamically inverting the mathematical model of the system to be controlled); and
- recovery of any effect of errors of measurement and tolerances of the system (which is obtained thanks to the feedback chain, based upon acquisition by a dedicated sensor).

An example of said architecture is represented by the scheme appearing in FIG. 1.

In particular, the "model-based control" approach has been used already for some time to obtain one of the basic functions of electronic control applied to internal-combustion engines: that of estimation of the charge (mass of fresh air $M_{AIR}$ and of residual gases $M_{EGR}$) taken in by the first combustion cylinder (charge determination).

The need for a physical model for estimating the charge (and in particular the fresh air) taken in by the cylinder, on the basis of which to carry out programming of the other actuations that contribute to combustion (e.g., the amount of petrol to be injected and the spark advance to be applied in the case of an internal-combustion engine with controlled ignition) is mainly linked to:

- the increasingly faster dynamics that can be obtained with modern systems for regulation of the intake air (and consequent problem of the speed of response): to be considered in this connection are modern motor-driven throttles, and even more systems for variable valve actuation, with which, at least in some technological implementations, it is possible to vary arbitrarily the amount of fresh intake air between two successive intake cycles; and
- the presence of multiple auxiliary-air actuators, all having an important effect on the estimation of the amount of intake air (with consequent problem of superposition of the effects on the air taken in), such as for example a supercharging system, and/or an EGR system, and/or a variable-valve-timing (VVT) device for regulation of phasing of the engine valves, and/or an intake manifold or rail with variable length of the branches, and/or a motor-driven throttle in an engine provided with a system for variable valve actuation, etc.

The above physical model, in addition to reproducing the behaviour of the system with adequate precision, must be provided with two fundamental properties, linked to the reliability thereof in current industrial electronic control units:

- analytical invertibility of the mathematical model of the system (the physical model developed in "direct" form, which provides estimation of the intake air as a function of the commands sent to the actuators, must be inverted so as to issue the commands to the actuators in order to obtain the desired trapping of fresh air); and
- limited computational burden (a complete execution of the estimation algorithm before each intake phenomenon, and hence at a rate equal to that of combustion).

PRIOR ART

The technical literature in the framework of the present invention is very vast and regards methods that may be applied to internal-combustion engines of both the spontaneous-ignition and the controlled-ignition types. Recourse to a mathematical model for determination of the fresh intake air is in any case a practice that is more widespread in the case of controlled-ignition engines, for which, since it is fundamental to reach the stoichiometric ratio between air and fuel in the widest possible range of engine operativeness, numerous calculation algorithms have been developed and refined.

In the framework of known methods developed for controlled-ignition engines, it is necessary to carry out a clear division into two different families of solutions.

A first family of known solutions regards methods that can be used for engines provided with a throttle upstream of the intake manifold (throttled engines), in which the throttle is used for regulation of the air taken in by the engine (see, for example, the documents Nos. U.S. Pat. No. 5,635,634 and U.S. Pat. No. 6,352,065). Said methods are characterized in that they are based upon a mathematical model obtained typically as follows:

- the perfect-gas state equation is applied to the environment of the intake manifold;
- a simple relation is deduced between the pressure conditions of the intake manifold and those of the cylinder at the end of the intake phase;
- a simple model (emptying-filling equation) is used for estimating the pressure in the intake manifold; and
- different corrections are made to take into account the presence of possible other actuators present on the engine and having an effect on the air taken in.

Other solutions applicable to conventional engines are known from DE 103 49 676 A1 and ERIKSSON, LARS; ANDERSSON, INGEMAR: "An analytic model for cylinder pressure in a four-stroke SI engine", SAE 2002 WORLD CONGRESS, vol. SAE, no. 2002-01-0371, 3 Apr. 2002, XP002390220 Detroit, Mich.

A second family of solutions regards methods that can be used for engines not provided with throttles (unthrottled engines), provided with a system for variable valve actuation capable of carrying out regulation of the air taken in by the engine. Since systems for variable valve actuation are a very recent technological development, the technical literature is not so extensive as in the case of the family of throttled engines.

An important document that shows a solution belonging to this family is, for example, U.S. Pat. No. 6,321,156, and is characterized by the following elements:

the relevant engine valve-lift parameter, understood as the maximum lift value assumed by the valve during the intake phase is introduced;

a relation between the flow of fresh intake air and the aforesaid engine parameter is deduced from experimental evidence, said "reference" flow corresponding to a (reference) condition fixed a priori for the other engine quantities upon which the flow itself depends;

introduction of different normalized correction factors, which correct the "reference" air flow referred to in the previous point, in the case where said other engine quantities upon which the flow itself depends differ from the "reference" conditions (e.g., devices with variable phasing of the valves, modulation of the pressure upstream of the valve). Said normalized factors do not act on the individual physical parameters that are involved in said process, but tend to modify "globally" the relation between the flow of fresh intake air and the relevant engine valve-lift parameter.

One of the purposes of the present invention is to propose a method for determination of the mass of fresh air taken in by the engine that may be applied to an engine, whether petrol or diesel, provided with a system for variable valve actuation, in which:

the "cylinder charge" trapped by the engine can be controlled, according to the need, by acting on the motor-driven throttle or else on the system for variable valve actuation; and the conditions upstream of the intake valve can be markedly affected, irrespective of the actuation of the valves and of that of a possible motor-driven throttle also by the actuation of other actuators present on the engine and having an effect on the thermodynamic conditions and the composition of the gases upstream of the intake valve and downstream of the exhaust valve.

In particular, a purpose of the present invention is to propose a method of the type specified above such that the technological implementation used for the system for variable valve actuation will not constitute a constraint or a limitation to the use of the method itself.

None of the known methods belonging to the two families of solutions described above meets the aforesaid need. In fact, the methods that can be used for throttled engines (first family) are based upon the presence of an intermediate accumulation volume, set between the motor-driven throttle and the intake valve, in which to carry out modulation of density of charge (fresh air and residual gases possibly present) through the action of the throttle. Said accumulation volume does not exist in the case of an unthrottled engine (or else in an engine in which the throttle will operate in such a way as not to carry out a direct regulation on the flow of intake air), to which the method of the invention must also be applicable.

On the other hand, also one of the most recent methods proposed for unthrottled engines (second family) and illustrated in U.S. Pat. No. 6,321,156, appears affected by the following weak points, which do not render it applicable to the case of an unthrottled engine:

the effect of auxiliary actuators on the intake air is modeled through a generic multiplicative factor of the flow of fresh air taken in, without it being, instead, determined on which physical phenomenon said auxiliary actuators will have a prevalent effect (for example, no differentiation is made between the effect on the amount of fresh intake air and the effect on the fraction of residual gases trapped);

the effect of the variation of the air flow as a function the pressure conditions upstream of the intake valve is characterized by a law of experimental derivation, which necessitates a specific calibration to be carried out presumably on the engine, aimed at determining the effect on the intake air of each pressure value that can be reached upstream of the intake valve; and the relevant engine parameter used for characterizing the effect of the system for variable valve actuation on the intake air (valve lift) does not appear adequate for the general case of a system for variable valve actuation capable of operating with different modalities of actuation of the valves, for which the valve-lift parameter could no longer be the most significant factor.

Neither does the document No. DE 19 928 560 appear relevant for the present invention, in so far as, even though it sets forth the intention of co-ordinating, in an engine equipped both with motor-driven throttle and with a system for variable valve actuation, the two aforesaid actuators, no mention is made of the method with which the intake air will be effectively estimated. Furthermore, amongst the claims of the method referred to in the present invention, of particular importance is the very fact that there will be compensation of the effect on the thermodynamic conditions of the gases upstream of the intake valve and downstream of the exhaust valve, and not only the ones linked to a modulation of the actuation of the motor-driven throttle.

An important purpose represented, in particular, by the present invention is to provide a method for determination of the mass of fresh air taken in by the engine that will be of general applicability, and hence also irrespective of the technological embodiment specifically implemented for the system for variable valve actuation with which the engine may be provided.

FIGS. 2A and 2B show a comparison between the conventional valve-lift profile (FIG. 2A), corresponding to an engine not provided with any system for modulation of the valve-lift profile at intake, and the one that can be obtained having available a completely flexible system for variable valve actuation (FIG. 2B). In particular, highlighted in FIG. 2B are the degrees of freedom available with said completely flexible system (represented in FIG. 2B in its ideal form, irrespective of the specific technological embodiment), and the corresponding "relevant parameters" for carrying out control of the "cylinder charge". Amongst said "relevant parameters" there have been highlighted:

the crank angle corresponding to opening of the intake valve VOA (Valve-Opening Angle);

the crank angle corresponding to closing of the intake valve VCA (Valve-Closing Angle); and the maximum lift of the valve VLH (Valve-Lift Height).

The parameter VOA has a preponderant effect on the modulation of the exhaust-gas recycling (EGR) provided directly within the cylinder, or "Internal EGR". The parameters VCA and VLH have, instead, a preponderant effect on the modulation of the amount of fresh air. In the case of multiple valve actuation (MVA) in the course of the intake phase of the engine, a further parameter that affects the amount of fresh air is the number of sub-actuations that make up MVA.

PURPOSE OF THE INVENTION

The main purpose of the present invention is to overcome the limitations of the known solutions mentioned above, proposing a method for determination of the mass of fresh air taken in by the engine that will be able in particular to achieve the following targets:
  possibility of application to internal-combustion engines having configurations either of the throttled type or of the unthrottled type;
  possibility of application both to engines provided with a conventional system for controlling the engine valves and to engines provided with a system for variable actuation of the intake valves, irrespective of the technological implementation of said system for variable actuation (which can be only partially flexible, i.e., capable of varying only the position of the lift profile of the intake valves with respect to the crank angle, or else completely flexible, i.e., of the type illustrated in FIG. 2B); and
  possibility of taking into account, in a separate way, the effects on the amount of the fresh intake air deriving respectively from:
    auxiliary actuators possibly present on the engine and having an effect on the thermodynamic conditions of the gases upstream of the intake valve and downstream of the exhaust valve;
    possible completely flexible system for variable actuation of the intake valves,
  obtained by introducing specific intermediate physical parameters in which to concentrate the effect of each of the foregoing;
  reduction of the experimental work necessary for identification of the physical model on which the method is based, i.e., for determining the numeric values of the quantities that appear in the model.

THE INVENTION

The above and further purposes and advantages are achieved, according to the invention, by proposing an engine according to claim 1 and a method according to claim 10. Further preferred and advantageous characteristics of the invention are defined in the dependent claims.

DESCRIPTION OF THE FIGURES

Further characteristics and advantages of the invention will emerge from the ensuing description, which is provided purely by way of non-limiting example, with reference to the annexed plate of drawings, in which:
FIG. 3 illustrates a schematic table that shows the approach adopted according to the invention for determining the mass of fresh intake air, taking into account different modalities of actuation of the intake valve and consequent different profiles of intake-valve lift.

DETAILED DESCRIPTION OF A PREFERRED EMBODIMENT

Figure 4:
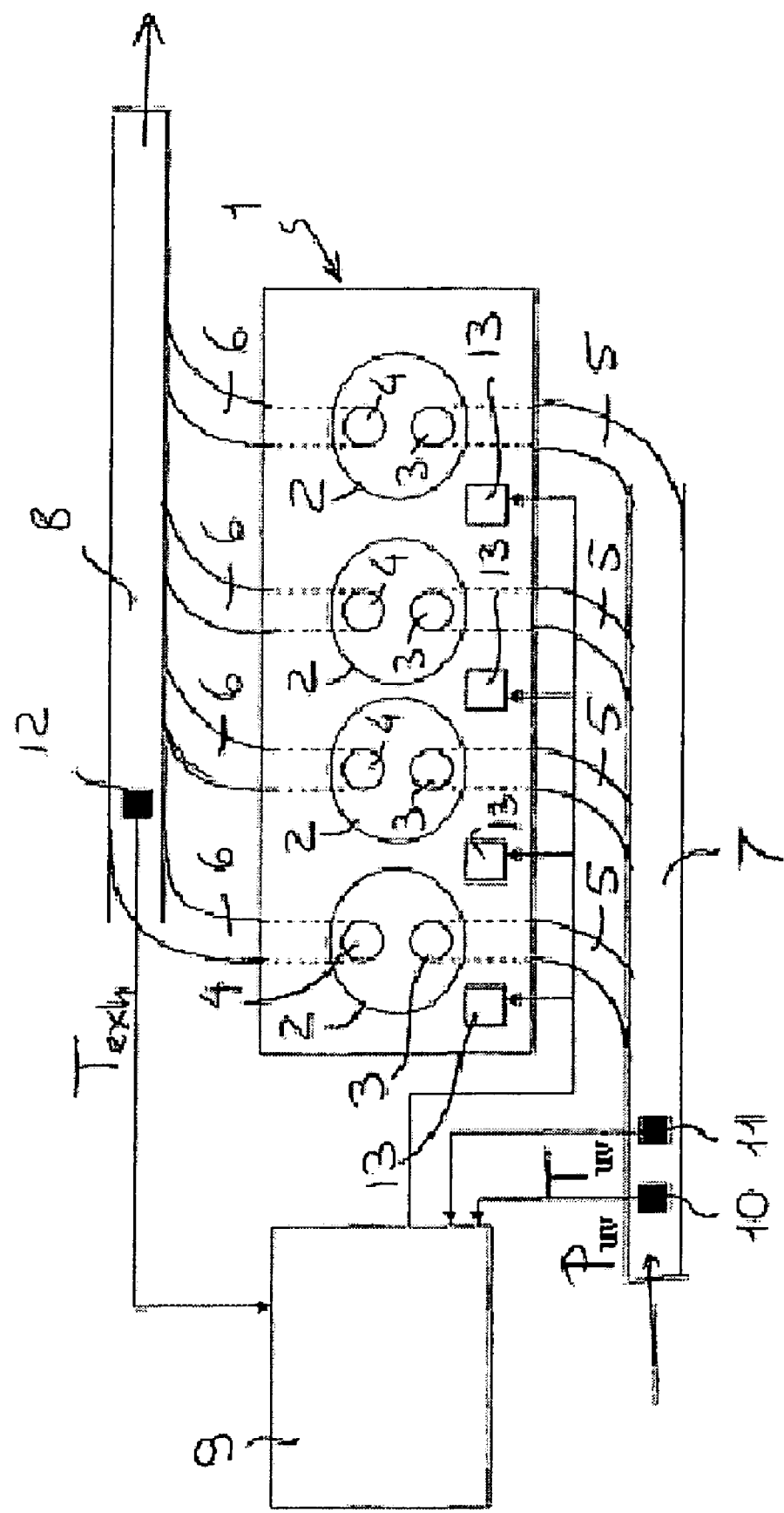
FIG. 4 is a diagram of an engine according to the invention.

FIG. 4 of the annexed plate of drawings shows an internal-combustion engine 1, for example of the petrol type, comprising four cylinders in line 2, each equipped with an intake valve 3 and an exhaust valve 4, which control, respectively, an intake pipe 5 and an exhaust pipe 6 communicating, respectively, with an intake manifold 7 and an exhaust manifold 8. An electronic control unit 9 is programmed for determining the mass of fresh air taken in by the engine using the method of the present invention. The electronic control unit 9 receives the signals at output from a pressure sensor 10 and from a temperature sensor 11, set in the intake manifold, upstream of the intake valves 3, for detecting the temperature $T_{uv}$ and the pressure $p_{uv}$ upstream of the intake valves 3. The sensor 10 can be positioned both in the intake manifold, as illustrated, and in each of the branchings of the manifold, in any case upstream of the intake valve of a cylinder. A temperature sensor 12 is also set in the exhaust manifold 8 for measuring the temperature $T_{exh}$ downstream of the exhaust valves 4. Alternatively, it is possible to envisage programming of the electronic control unit 9 for calculating the temperature $T_{exh}$ on the basis of a mathematical model. In the example illustrated, the electronic control unit 9 also controls devices 13 for variable valve actuation 13. The electronic control unit 9 also receives the signal at output from a sensor (not illustrated) for detecting the engine r.p.m.

The invention relates to a method for determination of the amount of fresh air taken in by an internal-combustion engine that is equipped at least with:
  a conventional system of valve actuation capable of bringing about a given lift profile for the intake valves and one for the exhaust valves,
  and is possibly equipped with:
  a multiplicity of auxiliary actuators, having an effect on the thermodynamic conditions of the gases upstream of the intake valve or valves and downstream of the exhaust valve or valves, and consequently having an effect on the charge taken in by the engine,
  and is possibly equipped with:
  a partially flexible system for variable actuation of the exhaust valves, capable of varying the angular position of said profiles of exhaust-valve lift with respect to the position of the engine shaft,
  and is possibly equipped with:
  a completely flexible system for variable valve actuation, acting on the intake valves, capable of carrying out, independently on each intake valve, single valve actuations (SVAs), for which it is possible to modulate the instant of opening and/or closing and/or maximum height of the valve-lift profile, and/or a plurality of successive cycles of the aforesaid single valve actuations during the conventional intake phase (multiple valve actuation—MVA)

The method proposed with the present invention is characterized by the following elements:
  identification of a physical model adequate for describing the phenomenon of trapping of fresh air in the cylinder, having the following characteristics:

algebraic model, in which the relation between the control variable and the amount of fresh intake air proves to be analytically "invertible";

usability for internal combustion engines having a configuration both of a throttled type and of an unthrottled type, possibly equipped with a completely flexible system for variable actuation of the intake valves;

separation of effects between:

modulation of operating conditions external to the cylinder (viz., the thermodynamic conditions in the intake manifold and exhaust manifold); and modulations acting on the valve-lift profile of the intake valves.

In particular, two models have been identified, the first of which has an altogether general validity ("general model"), and is applicable without restrictions to SVAs, the second of which, the "sonic model", is, instead, the one that can be used for SVAs whereby the condition of sonic flow of the gases through the intake valve is verified; recourse to this second model is extremely effective in the case of MVAs, and in particular as regards estimation of air taken in by the sub-actuations subsequent to the first and constituting the MVA, there being guaranteed with said model the linear superposition of the contributions of each sub-actuation included in the MVA.

For both of the models cited, the approach defined in what follows was adopted.

a) Identification of a basic equation:

general model: perfect-gas state equation calculated at the instant of closing of the intake valve; and sonic model: Saint Venant law for the flow of gases through a nozzle in sonic conditions.

b) Identification of an intermediate parameter in which to concentrate the effect of the modulation of the "valve-lift profile" by the completely flexible system for actuation of the intake valves. In the method according to the invention, irrespective of the technological implementation of the system for variable valve actuation, the "intermediate parameter" adopted in the model is such as to concentrate in itself the effect of the modulation of the "valve-lift profile"; said general parameter will be functionally dependent in different ways according to the technological implementation of the system for variable valve actuation.

In particular, the intermediate parameter is the following:

general model: $F_p$ is the ratio between the pressure inside the cylinder and the pressure upstream of the intake valve, calculated at the instant of closing of the intake valve;

sonic model: $F_v$ is the integral of the isentropic area of the intake valves.

FIG. 3 provides some examples of functional dependence for the intermediate parameter $F_p$ and/or $F_v$, corresponding to different technological implementations of the system for variable valve actuation.

c) Identification of a set of sub-models with which to describe the effect of the modulation of the operating conditions outside the cylinder (viz., the thermodynamic conditions in the intake manifold and exhaust manifold) and that of the partially flexible system for variable actuation of the exhaust valves, which is able to vary the angular position of said exhaust-valve lift profile with respect to the position of the engine shaft. The following quantities have, in particular, been used:

measurement of $P_{uv}$ and $T_{uv}$: these enable compensation of the variations in air density in the intake manifold linked to the presence of a motor-driven throttle or a turbosupercharging system;

only for the "general model", $T_{CYL}$ and $M_{EGR}$: these enable compensation of the effects of introduction of internal EGR in the cylinder charge.

d) Identification of a set of conditions and of a corresponding method with which to extend the applicability of the models referred to above, developed for management of the SVAs, in the case of multiple valve actuations (MVAs) of the intake valve at one and the same intake step; in particular:

the condition whereby the contributions of the individual sub-actuations constituting the MVA may be evaluated as independent contributions is the following:

apart from the first sub-actuation, which is not subjected to constraints, all the subsequent ones have to be such as to determine a condition of sonic flow of the gases through the intake valve, throughout the duration of the MVA;

the method used for combining the contributions of the single sub-actuations constituting the MVA is the following:

introduction of the concept of "fraction of air" taken in individually by each sub-actuation (treated as independent SVA);

first sub-actuation: for the fraction of air taken in by said first sub-actuation, both the "general model" and the "sonic model" can be used;

for all the sub-actuations subsequent to the first and constituting the MVA, the fractions of air corresponding to said sub-actuations are estimated by applying the "sonic model" for each sub-actuation, with a calculation made as if each sub-actuation were an independent SVA;

sum of the contributions of the sub-actuations for combining the total contributions to the MVA;

instead, if even just one sub-actuation subsequent to the first is performed in such a way that the flow of the gases through the opening corresponding to said sub-actuation does not occur in sonic conditions, the criterion of superposition of effects is no longer rigorously applicable; in this latter case, it is necessary to:

bring back estimation of air of the MVA to the "general model";

identify, as "relevant parameter" of the MVA the angle at which the last cycle of valve opening terminates altogether ("last intake-valve-closing angle"); and introduce a specific pressure ratio $F_p$, which will depend upon the combination of the profiles of the individual sub-actuations but will not be reduceable to the sum of the contributions of the individual sub-actuations.

e) Identification of a set of conditions and of a corresponding method with which to extend the applicability of the methods set forth above also to the case of multivalve engine provided with at least two intake valves and a completely flexible system for variable valve actuation such that independent action on each valve of the same cylinder will enable a differentiated mode of actuation on each valve of the same cylinder. In particular:

if at the most one of the valves is actuated in such a way that the flow of the gases through the opening corresponding to said valve will not occur in sonic conditions, whereas said sonic conditions are verified for the flows that traverse the other valves, then the criterion of superposition of the effects of the fractions of air taken in by each SVA is used for combining the total contributions of the air taken in, in a way similar to the case of the MVA performed on a single valve;

instead, if more than one valve is actuated in such a way that the flow of gases through the opening corresponding to said valve does not occur in sonic conditions, said criterion of superposition of the effects can no longer be rigorously applied; in this latter case, it is necessary to:

bring back estimation of air to the "general model";

identify, as "relevant parameter" of the MVA the angle at which the last valve that is still open closes definitively ("last intake-valve-closing angle");

introduce a specific pressure ratio $F_p$, which will depend upon the combination of the profiles of the individual sub-actuations but will not be reduceable to the sum of the contributions of the individual sub-actuations.

Provided in what follows is a detailed description of the two models (general and sonic) developed for estimation of the fresh air in the case of SVAs, which can also be applied to the other cases as described above.

"General" Model

Figure 1:
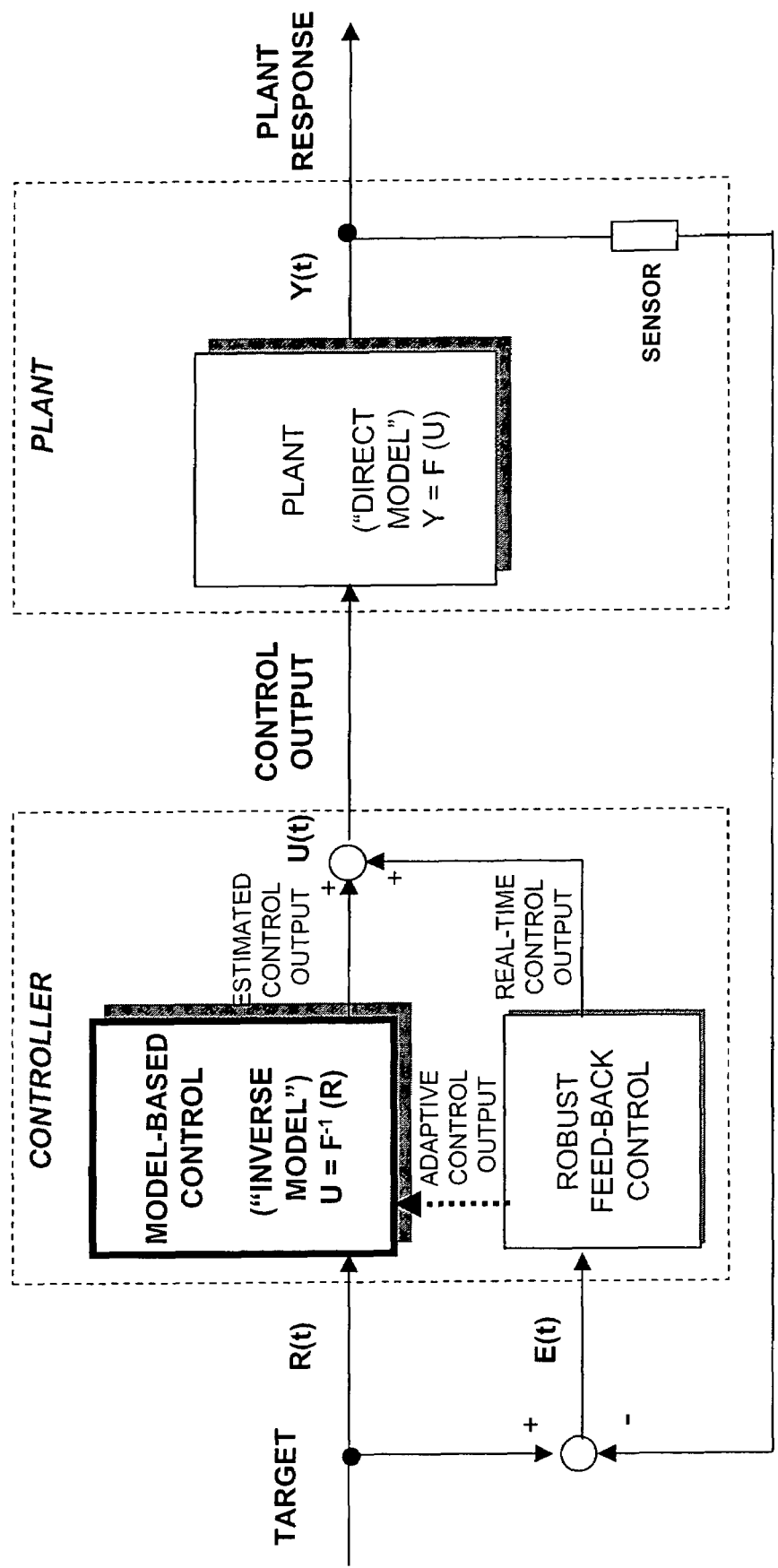
FIG. 1, which has already been described above, illustrates a control scheme based upon a mathematical model.
Figure 2A:
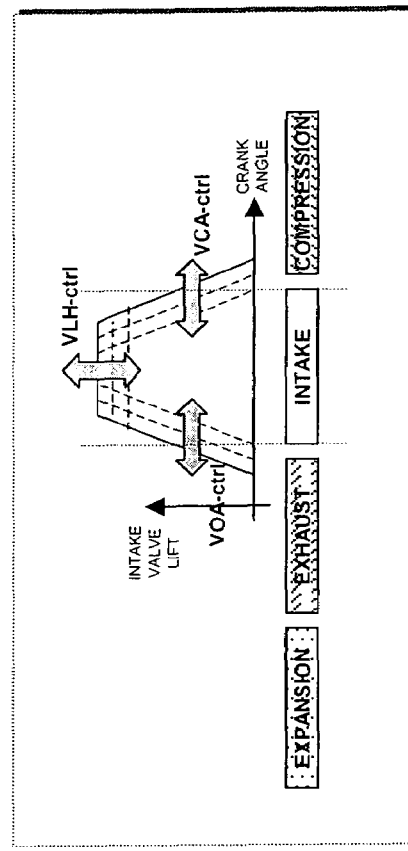
FIGS. 2A, 2B are schematic illustrations of the intake-valve lift cycle in a conventional engine and in an engine provided with a completely flexible system for variable actuation of the intake valves.
Figure 2B:
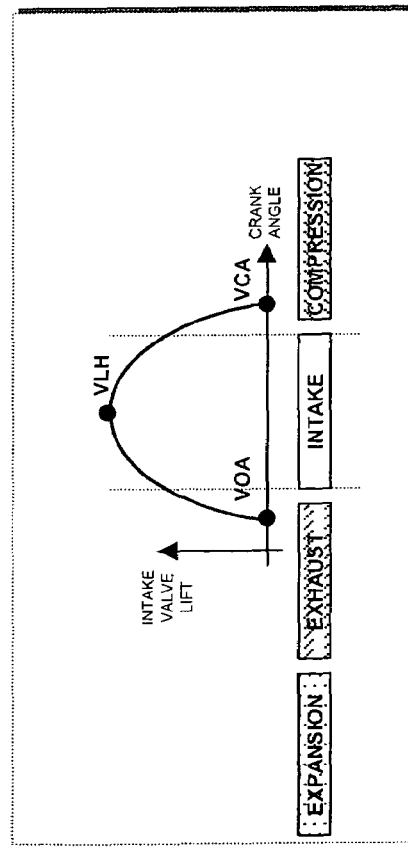

Identified hereinafter is a "general" model, based upon the perfect-gas state equation applied to the closed volume of the cylinder at the instant coinciding with the intake-valve-closing angle, with which it is possible to carry out estimation of the amount of fresh intake air for any type of SVA that can be envisaged with the aforesaid completely flexible system for variable valve actuation (FIG. 2B), comprising as particular subcase that of a conventional system for intake-valve actuation (FIG. 2A) or that of a partially flexible system for variable actuation of the intake valves, which is able to vary only the angular position of said lift profile of the intake valves with respect to the position of the engine shaft.

The basic equation is the following:

$$p_{cyl} \cdot V_{cyl} = (M_{air} + M_{EGR}) \cdot R \cdot T_{cyl}$$

where: $p_{cyl}$, $V_{cyl}$, $T_{cyl}$ are, respectively, the pressure, the volume and the temperature inside the cylinder at the instant of closing of the intake valve (VCA), and $M_{air}$ and $M_{EGR}$ are, respectively, the mass of fresh air and that of exhaust gases trapped in the cylinder at VCA; and R is the universal gas constant divided by the molecular weight of the gas itself.

The "general" model is in turn made up of a number of sub-models corresponding to each of the intermediate parameters that appear in the perfect-gas state equation and that cannot be easily measured directly with a sensor since they are intermediate parameters corresponding to quantities inside the cylinder.

In particular:

As regards $V_{cyl}$ the following "geometrical" relation is used to express the volume of the cylinder up to VCA:

$$V_{cyl} = V_{swept}(VCA) + V_{dead}$$

As regards $p_{cyl}$ the following factorization is used:

$$p_{cyl} = Fp(RP_{vlp}, rpm) \cdot p_{uv}$$

where $p_{uv}$ is the pressure upstream of the intake valve, whilst the "intermediate parameter" $F_p$ contains within it the generic dependence upon the parameter $RP_{vlp}$ (relevant parameter of the valve-lift profile), which can assume different meanings according to the technological implementation of the system for variable valve actuation (see FIG. 3).

The advantages of the factorization used with the present method, based upon experimental evidence, are the following:

separation of the effects deriving from the modulation of $p_{uv}$ from the ones deriving from the modulation of "valve-lift profile", where the latter are concentrated in $F_p$;

since $F_p$ is independent of $p_{uv}$, the calibration of the parameter $F_p$ (to be carried out experimentally on the engine) can be performed in one (and only one) arbitrary condition of $p_{uv}$.

Particular cases:

in the particular case of a conventional system for actuation of intake valves (FIG. 2A), the parameter $F_p$ is found to be dependent only upon the engine r.p.m.;

in the particular case of a partially flexible system for variable actuation of the intake valves, capable of varying only the angular position of said lift profile of the intake valves with respect to the position of the engine shaft, the parameter $F_p$ is found to be a function of said angular position subject to control and of the engine r.p.m.

As regards $T_{cyl}$, starting from the principle of energy conservation during the intake phase, through some analytical passages that are given in what follows, a modelling for $T_{cyl}$, is obtained.

If M designates the mass of the gases taken in by the cylinder and T their temperature, which are both time-variant quantities, it is possible to write the principle of energy conservation in the differential form as follows:

$$(M + dM) \cdot (T + dT) = M \cdot T + dM \cdot T_{uv}$$

$$\Downarrow$$

$$dT = \frac{M \cdot T + dM \cdot T_{uv}}{M + dM} - T \approx \frac{dM \cdot (T_{uv} - T)}{M}$$

$$\Downarrow$$

$$\frac{dT}{T_{uv} - T} = \frac{dM}{M}$$

where the temperature $T_{uv}$ of the gases upstream of the intake valve has been introduced.

To obtain T at the instant of VCA it is possible to integrate the preceding differential equation between the instant of start of the intake phase (at which it is assumed $T=T_{exh}$ and $M=M_{EGR}$) and the instant coinciding with VCA (at which it is assumed $T=T_{cyl}$ and $M=M_{air}+M_{EGR}$), with the following result:

$$\int_{T_{exh}}^{T_{cyl}} \frac{dT}{T_{uv} - T} = \int_{M_{EGR}}^{M_{EGR}+M_{air}} \frac{dM}{M}$$

By solving analytically the integral, we obtain $$-\log\left(\frac{T_{uv} - T_{cyl}}{T_{uv} - T_{exh}}\right) = \log\left(\frac{M_{EGR} + M_{air}}{M_{EGR}}\right) \Rightarrow \frac{T_{uv} - T_{exh}}{T_{uv} - T_{cyl}}$$

$$= \frac{M_{EGR} + M_{air}}{M_{EGR}}$$

from which, with simple algebraic passages, we arrive at the following final relation:

$$T_{cyl} = \frac{M_{air} \cdot T_{uv} + M_{EGR} \cdot T_{exh}}{M_{air} + M_{EGR}}$$

whence we find that the temperature of the cylinder is equal to the weighted average of the temperatures respectively of the fresh intake air and of the recirculated gases present in the cylinder.

Now, summarizing the contributions of the individual sub-models in the basic equation, we obtain the following expression for $M_{air}$, which is the "general" model:

$$M_{air} = \frac{p_{uv} \cdot Fp(RP_{vlp}, \text{rpm}) \cdot \lfloor V_{swept}(VCA) + V_{dead} \rfloor - \frac{M_{EGR} \cdot R \cdot T_{exh}}{R \cdot T_{uv}}}{R \cdot T_{uv}}$$

Sonic Model

A "sonic model" is now identified, based upon the Saint Venant equation for the flow of gases through a nozzle, with which it is possible to estimate the amount of fresh intake air for those types of SVAs that can be obtained with the aforesaid completely flexible system for variable valve actuation (FIG. 2B) for which the hypothesis of sonic flow (ratio between the pressures downstream and upstream of the intake valve less than 0.52 throughout the intake phase) is verified.

The basic equation is the following:

$$\frac{d}{dt}M_{air} = \frac{p_{uv}}{\sqrt{R \cdot T_{uv}}} \cdot A_{is}[h_v(RP_{vlp}, \text{rpm})] \cdot \Psi\left(\frac{p_{cyl}}{p_{uv}}\right)$$

where:

$p_{uv}$ and $T_{uv}$ are, respectively, the pressure and the temperature upstream of the intake valve;

$p_{cyl}$ is the pressure inside the cylinder during the intake phase;

$M_{air}$ is the mass of fresh air taken in by the cylinder, and $A_{is}$ is the isentropic area of the intake valve;

$h_v(RP_{vlp}, \text{Rpm}, ang_m)$ is the valve-lift profile that can be obtained at the engine r.p.m. rpm and for a certain value of the parameter $RP_{vlp}$ (relevant parameter of the valve-lift profile); said valve-lift profile is in general a function of the crank angle $ang_m$;

$$\Psi\left(\frac{p_{cyl}}{p_{uv}}\right)$$

is the Saint-Venant factor.

R is the universal gas constant divided by the molecular weight of the gas trapped by the cylinder. In sonic conditions the following relation applies:

$$\Psi\left(\frac{p_{cyl}}{p_{uv}} < 0.52\right) = K_{sonic}$$

Hence, integrating the basic equation for the entire duration of the intake, we arrive at the following expression:

$$M_{air} = K_{sonic} \cdot \frac{1}{6 \cdot \text{rpm}} \cdot \frac{p_{uv}}{\sqrt{R \cdot T_{uv}}} \cdot \int_{VOA}^{VCA} A_{is}[h_v(RP_{vlp}, \text{rpm}, ang_m)] d\ell$$

Introducing then the "intermediate parameter" $F_v$, which, by definition, is equal to the integral of the isentropic area of the intake valves performed on the variable of the crank angle, i.e., $$Fv(RP_{vlp}, \text{rpm}) = \int_{VOA}^{VCA} A_{is}[h_v(RP_{vlp}, \text{rpm}, ang_m]$$

we arrive at the final expression, referred to as "sonic model":

$$M_{air} = K_{sonic} \cdot \frac{1}{6 \cdot \text{rpm}} \cdot \frac{p_{uv}}{\sqrt{R \cdot T_{uv}}} \cdot Fv(R$$

In the above expression, the two following properties are evident, which are strongpoints of the sonic method:

- separation of the effects of the modulation of $p_{uv}$ from the ones of the modulation of "valve-lift profile", the latter being concentrated in $F_v$;
- since, thanks to the hypothesis of sonic flow introduced previously, $M_{air}$ is independent of $p_{cyl}$, the sonic model can be used for combining in a sum the contributions of the sub-actuations constituting an MVA; in fact, said contributions are not sensitive to the variations of $p_{cyl}$ during intake.

As is evident from the foregoing description, the method proposed with the present invention for determining the mass of the fresh air taken in by the engine is of general applicability, and in particular is applicable irrespective of the technological implementation specifically used for the system for variable valve actuation with which the engine can be provided.

Of course, without prejudice to the principle of the invention, the details of construction and the embodiments may vary widely with respect to what is described and illustrated herein, without thereby departing from the scope of the present invention as defined in the annexed claims.

According to an alternative to be considered also comprised in the field of the invention, it is possible to envisage that determination of the mass of fresh air taken in by the engine will be performed always and only by means of the sonic model defined above.

| LEGEND | |
|---|---|
| VVT | Variable Valve Timing (systems for the variation of valve phasing) |

-continued

| LEGEND | |
|---|---|
| EGR | Exhaust-Gas Recycling system |
| EVC | Early Valve Closing |
| LVO | Late Valve Opening |
| SVA | Single Valve Actuation |
| MVA | Multiple Valve Actuation |
| VCA | Valve Closing Angle |
| VLH | Valve Lift Height |
| VOA | Valve Opening Angle |
| $M_{AIR}$ | Mass of fresh air trapped in the cylinder |
| $M_{EGR}$ | Mass of residual gases present in the cylinder |
| $P_{CYL}$ | Total pressure of the gases within the cylinder |
| $P_{uv}$ | Total pressure of the gases upstream of the intake valve (upstream valve) |
| $T_{uv}$ | Temperature of the gases upstream of the intake valve (upstream valve) |
| RC | Compression ratio |
| $T_{CYL}$ | Temperature of the gases within the cylinder |
| VCA | Valve-Closing Angle |
| VLH | Valve-Lift Height |
| VOA | Valve-Opening Angle |
| $V_{CYL}$ | Volume inside the cylinder at VCA |
| $V_{dead}$ | Dead-space volume |
| $V_{swept}$ | Volume of the cylinder swept by the piston |
| $RP_{vlp}$ | Relevant parameter for Valve Lift Profile |
| rpm | Engine r.p.m. |
| $K_{sonic}$ | Saint-Venant factor in sonic conditions. |

What is claimed is:

1. An internal-combustion engine, comprising:
   at least one cylinder;
   at least one intake pipe and at least one exhaust pipe associated to the cylinder;
   at least one intake valve and at least one exhaust valve, which control passage through said intake and exhaust pipes;
   a system for variable actuation at least of the intake valves,
   first sensor means for detecting the temperature in said intake pipe;
   second sensor means for detecting the pressure in said intake pipe, upstream of the intake valve;
   third sensor means for detecting the engine r.p.m.;
   fourth means for detecting or calculating the temperature in said exhaust pipe; and
   an electronic control unit pre-arranged for receiving the signals at output from said first, second and third sensor means and for calculating the mass of fresh air taken in by the engine,
   said engine being wherein said electronic control unit is programmed for calculating the mass of fresh air taken in by the engine on the basis of a calculation of the pressure within the cylinder at the instant of intake valve closing, in which said pressure within the cylinder at intake valve closing is obtained by multiplying the detected pressure value upstream of the intake valve by a pressure factor F:

$$p_{cyl} = p_{uv} \cdot F_p$$

and wherein said pressure factor is a factor pre-determined empirically for said engine uniquely as a function of:
   the engine r.p.m.; and
   a parameter, relevant parameter of the valve-lift profile, which is in turn determined empirically, and indicates the profile of the intake-valve lift as the engine angle varies.

2. The engine according to claim 1, wherein said electronic control unit is programmed for calculating the mass of fresh air taken in by the engine on the basis of the following general expression:

$$M_{air} = \frac{p_{uv} \cdot Fp(RP_{vlp}, \text{rpm}) \cdot \lfloor V_{swept}(VCA) + V_{dead} \rfloor - M_{EGR} \cdot R \cdot T_{exh}}{R \cdot T_{man}}$$

where:
$M_{air}$ is the mass of fresh air taken in by the engine;
$p_{uv}$ is the pressure in said intake pipe;
rpm is the engine r.p.m.;
$RP_{vlp}$ (relevant parameter of the valve-lift profile) is the aforesaid empirical parameter indicating the intake-valve-lift profile, which it is necessary to take into account only in the case where the intake valve is of the variable-lift type;
$F_p$ is the aforesaid pressure factor that expresses the ratio $p_{cyl}/p_{uv}$ between the pressure in the cylinder $p_{cyl}$ and the pressure $p_{uv}$ in the intake pipe, and that is pre-determined empirically as a function both of $RP_{vlp}$ and of the engine r.p.m., $F_p$ being instead a function only of the engine r.p.m. in the case of intake valve with fixed lift;
$V_{swept}$ is the volume swept by the piston within the cylinder during the intake phase, up to the instant in which VCA (closing of the intake valve) occurs;
$V_{dead}$ is the volume of the combustion chamber when the piston is at TDC (top dead centre);
$M_{EGR}$ is the mass of the residual combustion gases present in the cylinder during the intake phase;
$T_{exh}$ is the temperature in the exhaust pipe;
R is the universal gas constant divided by the molecular weight of the gas trapped by the cylinder; and
$T_{uv}$ is the temperature in the intake pipe.

3. The engine according to claim 2, wherein said electronic control unit is programmed for calculating the mass of fresh air taken in by the engine on the basis of an auxiliary expression, different from said general expression, should there occur a sonic flow of air in the intake pipe, i.e., when the ratio between the pressure upstream and the pressure downstream of the valve is less than 0.52.

4. The engine according to claim 3, wherein said auxiliary expression is the following:

$$M_{air} = K_{sonic} \cdot \frac{1}{6 \cdot \text{rpm}} \cdot \frac{p_{uv}}{\sqrt{R \cdot T_{uv}}} \cdot Fv(RP_{vlp}, \text{rpm})$$

where:
$K_{sonic}$ is the Saint-Venant factor in sonic conditions; and
$F_v(RP_{vlp}, \text{rpm})$ is a parameter that is a function of the relevant parameter of the valve-lift profile and of the engine r.p.m., equal to:

$$Fv(RP_{vlp}, \text{rpm}) = \int_{VOA}^{VCA} A_{is}[h_v(RP_{vlp}, \text{rpm}, ang_m)] \, d(ang_m)$$

where:
$A_{is}$ is the isentropic area of the intake valve;
$h_v(RP_{vlp}, \text{rpm}, ang_m)$ is the valve-lift profile that can be obtained at the engine r.p.m. rpm and for a certain value of the parameter $Rp_{vlp}$ (relevant parameter of the valve-lift profile); said valve-lift profile being in general a function of the crank angle $ang_m$;

VOA, VCA are the values of the crank angle corresponding to opening and closing, respectively, of the intake valve.

5. The engine according to claim 3, wherein in the case of an engine with system for variable valve actuation, in which the intake valve is actuated a number of times in one and the same intake phase, according to a plurality of sub-cycles of opening and closing of the valve, the electronic control unit is programmed for calculating the mass of fresh air taken in by the engine as sum of the partial contributions due to each single sub-cycle of opening and closing of the valve, with a calculation made as if each sub-actuation were a single independent actuation.

6. The engine according to claim 5, wherein the electronic control unit is programmed in such a way that the mass of air taken in during the first sub-cycle is calculated on the basis of said general expression or of said auxiliary expression, whilst the mass of air taken in during each subsequent sub-cycle is calculated on the basis of said auxiliary expression.

7. The engine according to claim 6, wherein the electronic control unit is programmed in such a way that, if even just one sub-actuation subsequent to the first is performed in such a way that the flow of the gases through the opening corresponding to said sub-actuation will not occur in sonic conditions, the electronic control unit is programmed for calculating the amount of air globally taken in following upon the aforesaid multiple actuations via the aforesaid general expression identifying, as relevant parameter of the cycle of multiple valve actuations (MVA) the engine angle at which the last cycle of valve opening concludes altogether, and pre-determining a specific pressure factor, which depends upon the combination of the profiles of the single sub-actuations, but cannot be reduced to the sum of the contributions of the single sub-actuations.

8. The engine according to claim 3, wherein:
said engine is provided with at least two intake valves per cylinder and with a completely flexible system for variable actuation of said intake valves, which acts independently on each valve of the same cylinder, according to a differentiated actuation mode;
the system of actuation of the intake valves is such that only one at the most of the intake valves is actuated in such a way that the flow of the gases through the opening corresponding to said valve does not occur in sonic conditions, whereas said sonic conditions are verified for the flows that traverse the other valves; and
said electronic control unit is programmed in such a way that the mass of fresh air taken in by the engine is calculated as sum of the fractions of air taken in through each intake valve, with a calculation made as if the actuation of each valve were a single independent actuation.

9. The engine according to claim 3, wherein:
said engine is provided with at least two intake valves per cylinder and a completely flexible system for variable actuation of said intake valves, which acts independently on each valve of the same cylinder, according to a differentiated actuation mode;
the system of actuation of the intake valves is such that more than one intake valve, when it is actuated, provides a flow of gases through the corresponding opening that is not in sonic conditions; and
the electronic control unit is programmed for calculating the amount of air globally taken in following upon the actuations of all the intake valves via the aforesaid general expression, identifying, as "relevant parameter" of the actuations of all the intake valves the engine angle at which the last valve that is still open closes definitively, and pre-determining a specific pressure factor, which depends upon the combination of the profiles of the individual actuations of the various valves, but cannot be reduced to the sum of the contributions of the individual actuations.

10. A method for determining the mass of fresh air taken in by an internal-combustion engine, in which said engine comprises at least one cylinder, at least one intake pipe, and at least one exhaust pipe associated to the cylinder, at least one intake valve and at least one exhaust valve that control the passage through said intake and exhaust pipes, and a system for variable actuation at least of the intake valves, said method comprising the operations of:
detecting the temperature in said intake pipe;
detecting the pressure in said intake pipe, upstream of the intake valve;
detecting the engine r.p.m.;
detecting or calculating the temperature in said exhaust pipe; and
calculating the amount of fresh air taken in by the engine on the basis of the values thus detected,
said method being characterized in that the mass of fresh air taken in by the engine is determined on the basis of a calculation of the pressure within the cylinder at the instant of intake valve closing, in which said pressure within the cylinder at intake valve closing is obtained by multiplying the detected pressure value upstream of the intake valve by a pressure factor $F_p$:

$$p_{cyl} = p_{uv} \cdot F_p$$

and wherein said pressure factor is a factor pre-determined empirically for said engine uniquely as a function of:
the engine r.p.m.; and
a parameter, relevant parameter of the valve-lift profile, which is in turn determined empirically and indicates the profile of the intake-valve lift as the engine angle varies.

11. The method according to claim 10, wherein the mass of fresh air taken in by the engine is calculated on the basis of the following general expression:

$$M_{air} = \frac{p_{uv} \cdot Fp(RP_{vlp}, \text{rpm}) \cdot \lfloor V_{swept}(VCA) + V_{dead} \rfloor - M_{EGR} \cdot R \cdot T_{exh}}{R \cdot T_{uv}}$$

where:
$M_{air}$ is the mass of fresh air taken in by the engine;
$p_{uv}$ is the pressure in said intake pipe;
rpm is the engine r.p.m.;
$RP_{vlp}$ (relevant parameter of the valve-lift profile) is the aforesaid empirical parameter indicating the intake-valve-lift profile, which it is necessary to take into account only in the case where the intake valve is of the variable-lift type;
$F_p$ is the aforesaid pressure factor which expresses the ratio $p_{cyl}/p_{uv}$ between the pressure in the cylinder $p_{cyl}$ and the pressure $p_{uv}$ in the intake pipe and is pre-determined empirically as a function both of $RP_{vlp}$ and of the engine r.p.m., $F_p$ being instead a function only of the engine r.p.m. in the case of intake valve with fixed lift;

$V_{swept}$ is the volume swept by the piston within the cylinder during the intake phase, up to the instant in which VCA (closing of the intake valve) occurs;

$V_{dead}$ is the volume of the combustion chamber when the piston is at TDC (top dead centre), $M_{EGR}$ is the mass of the residual combustion gases present in the cylinder during the intake phase;

$T_{exh}$ is the temperature in the exhaust pipe;

R is the universal gas constant divided by the molecular weight of the gas trapped by the cylinder; and $T_{uv}$ is the temperature in the intake pipe.

12. The method according to claim 11, wherein the mass of fresh air taken in by the engine is calculated on the basis of an auxiliary expression, different from said general expression, should there occur a sonic flow of air in the intake pipe, i.e., when the ratio between the pressure upstream and the pressure downstream of the valve is less than 0.52.

13. The method according to claim 12, wherein said auxiliary expression is the following:

$$M_{air} = K_{sonic} \cdot \frac{1}{6 \cdot \text{rpm}} \cdot \frac{p_{uv}}{\sqrt{R \cdot T_{uv}}} \cdot Fv(RP_{vlp}, \text{rpm})$$

where:

$K_{sonic}$ is the Saint-Venant factor in sonic conditions; and $F_v(RP_{vlp}, \text{rpm})$ is a parameter that is a function of the relevant parameter of the valve-lift profile and of the engine r.p.m., equal to:

$$Fv(RP_{vlp}, \text{rpm}) = \int_{VOA}^{VCA} A_{is}[h_v(RP_{vlp}, \text{rpm}, ang_m)] \, d(ang_m)$$

where:

$A_{is}$ is the isentropic area of the intake valve;

$h_v(RP_{vlp}, \text{rpm}, ang_m)$ is the valve-lift profile that can be obtained at the engine r.p.m. rpm and for a certain value of the relevant parameter of the valve-lift profile $RP_{vlp}$; said valve-lift profile being in general a function of the crank angle $ang_m$; and VOA, VCA are the values of the crank angle corresponding to opening and closing, respectively, of the intake valve.

14. The method according to claim 12, wherein, in the case of an engine with system for variable valve actuation, in which the intake valve is actuated a number of times in one and the same intake phase, according to a plurality of sub-cycles of opening and closing of the valve, the mass of fresh air taken in by the engine is calculated as sum of the partial contributions due to each single sub-cycle of opening and closing of the valve, with a calculation made as if each sub-actuation were a single independent actuation.

15. The method according to claim 14, wherein the mass of air taken in during the first sub-cycle is calculated on the basis of said general expression or of said auxiliary expression, whilst the mass of air taken in during each subsequent sub-cycle is calculated on the basis of said auxiliary expression.

16. The method according to claim 14, wherein even if just one sub-actuation subsequent to the first is performed in such a way that the flow of the gases through the opening corresponding to said sub-actuation will not occur in sonic conditions, the amount of air globally taken in following upon the aforesaid multiple actuations is calculated via the aforesaid general expression identifying, as "relevant parameter" $RP_{vlp}$ of the cycle of multiple valve actuations the engine angle at which the last cycle of valve opening concludes altogether, and pre-determining a specific pressure factor $F_p$, which depends upon the combination of the profiles of the single sub-actuations, but cannot be reduced to the sum of the contributions of the single sub-actuations.

17. The method according to claim 12, wherein:

said engine is provided with at least two intake valves per cylinder and a completely flexible system for variable actuation of said intake valves, which acts independently on each valve of the same cylinder, according to a differentiated actuation mode, the system of actuation of the intake valves is such that only one at the most of the intake valves is actuated in such a way that the flow of the gases through the opening corresponding to said valve does not occur in sonic conditions, whereas said sonic conditions are verified for the flows that traverse the other valves; and the mass of fresh air taken in by the engine is calculated as sum of the fractions of air taken in through each intake valve, with a calculation made as if the actuation of each valve were a single independent actuation.

18. The method according to claim 12, wherein:

said engine is provided with at least two intake valves per cylinder and a completely flexible system for variable actuation of said intake valves, which acts independently on each valve of the same cylinder, according to a differentiated actuation mode;

the system of actuation of the intake valves is such that more than one intake valve, when it is actuated, provides a flow of gases through the corresponding opening that is not in sonic conditions; and the control unit is programmed for calculating the amount of air globally taken in following upon the actuations of all the intake valves via the aforesaid general expression, identifying, as "relevant parameter" $RP_{vlp}$ of the actuations of all the intake valves the engine angle at which the last valve that is still open closes definitively, and pre-determining a specific pressure factor $F_p$, which depends upon the combination of the profiles of the individual actuations of the various valves, but cannot be reduced to the sum of the contributions of the individual actuations.

* * * * *